United States Patent [19]

Son et al.

[11] Patent Number: 5,427,730
[45] Date of Patent: Jun. 27, 1995

[54] METHOD FOR THE PRODUCTION OF BIAXIALLY STRETCHED POLYESTER FILM FOR MAGNETIC RECORDING MEDIA

[75] Inventors: Young H. Son, Seoul; Hee J. Park, Gumi; Kyung S. Tae, Gumi; Byung C. Lee, Gumi, all of Rep. of Korea

[73] Assignee: Cheil Synthetics Inc., Kyungsan, Rep. of Korea

[21] Appl. No.: 343,918

[22] Filed: Nov. 17, 1994

[30] Foreign Application Priority Data

Dec. 31, 1993 [KR] Rep. of Korea ............... 93-32237

[51] Int. Cl.$^6$ ............... B29C 71/00; D03D 3/00
[52] U.S. Cl. ............... 264/235.8; 264/290.2; 428/330; 428/694 R; 428/900; 428/910
[58] Field of Search ............... 264/235.8, 290.2; 428/330, 694 R, 900, 910

[56] References Cited

U.S. PATENT DOCUMENTS

| | | | |
|---|---|---|---|
| 3,884,870 | 5/1975 | Dodson et al. | 260/40 R |
| 4,138,386 | 2/1979 | Motegi et al. | 524/130 |
| 4,539,389 | 9/1985 | Kiriyama et al. | 525/437 |
| 5,006,589 | 4/1991 | Sakamoto et al. | 524/430 |
| 5,071,690 | 12/1991 | Fukuda et al. | 428/480 |
| 5,106,681 | 4/1992 | Endo et al. | 428/331 |

*Primary Examiner*—Morton Foelak
*Attorney, Agent, or Firm*—Nikaido, Marmelstein, Murray & Oram

[57] ABSTRACT

A method for the production of biaxially stretched polyester film.

The method comprises the steps of: adding cubic calcium carbonate particles of calcite structure satisfying the following conditions at any stage of polyester preparation, so as to prepare polyester resin:

$$d_{25}/d_{75} < 2.00 \tag{1}$$

$$0.7 \leq d_{50} \leq 1.50 \tag{2}$$

$$a:b:c = 1:(1\sim1.5):(1\sim1.5) \tag{3}$$

wherein $d_{25}$, $d_{50}$ and $d_{75}$ are the diameters ($\mu$m) of particles when the accumulated weights of the particles are on the order of 25, 50 and 75% of the total weight of the particles, respectively, and a, b, c are width, length and height of the cubic calcium carbonate particles and the shortest one among a, b and c is set $a=1$; and applying melt-extrusion to the polyester resin.

The biaxially stretched copolyester film provided is superior in travelling capacity as well as abrasion resistance and scratch resistance, so that it is useful for magnetic recording media.

5 Claims, 1 Drawing Sheet

METHOD FOR THE PRODUCTION OF BIAXIALLY STRETCHED POLYESTER FILM FOR MAGNETIC RECORDING MEDIA

BACKGROUND OF THE INVENTION

1. Field of the invention

The present invention relates, in general, to a method for the production of biaxially stretched film and, more particularly, to an improvement in physical properties such as abrasion resistance, surface smoothness and slip property along with the method.

2. Description of the Prior Art

Polyester films can be widely utilized for magnetic applications such as video tapes, audio tapes, computer tapes and floppy discs, electrical applications such as condensers and electrical insulating pipes, package applications such as laminate films and metal vapor deposition films, and other applications such as microfilms, radio-photo films, architecture charts and stamping foils.

In magnetic applications, the polyester film is required to have a high level of surface smoothness and slip property. In last few years, the magnetic recording media have been rapidly improved, which demand the quality of base film. For example, in order to be applied to a magnetic tape such as a video tape, a polyester film, a base film, must have a highly smooth surface and a high data storage density.

For the improvement in travelling capability on processing, in slip property and in abrasion resistance, full well has it been known that outer particles, such as calcium carbonate, silica, alumina, zirconia, titan dioxide and inert polymer particles, are added.

Surface roughness of the polyester film which is obtained by the casting method must be kept in a suitable level. For example, if the surface roughness of a film is below a suitable level due to too small diameter of particle, a magnetic tape of the film is improved in electromagnetic transformation properties but worsened in travelling capacity. The inferiority of such property may lead to the generation of a great quantity of white powders and a great number of scratches. On the other hand, too large particles can enhance the travelling capacity of film but raises the surface roughness of film which results in the deterioration of electromagnetic transformation property such as drop-out.

To solve these problems, an effort has been made. For instance, at least two different particles which have different sizes were added. However, the particles are heterogeneous in shape and have a wide distribution of size, so that the surface roughness are non-uniform. In addition, huge protrusions on the film are apt to be formed, leading to the inferiority of the electromagnetic property of magnetic tape.

SUMMARY OF THE INVENTION

Therefore, an object of the present invention is to overcome the above problems encountered in prior arts and to provide a method for the production of biaxially stretched polyester film for magnetic recording media, capable of presenting superior abrasion resistance, surface smoothness and slip property.

In accordance with the present invention, the above object can be accomplished by a provision of a method for the production of biaxially stretched polyester film for magnetic recording media, comprising the steps of: adding cubic calcium carbonate particles of calcite structure satisfying the following conditions at any stage of polyester preparation, so as to prepare polyester resin:

$$d_{25}/d_{75} < 2.00 \tag{1}$$

$$0.7 \leq d_{50} \leq 1.50 \tag{2}$$

$$a:b:c = 1:(1 \sim 1.5):(1 \sim 1.5) \tag{3}$$

wherein $d_{25}$, $d_{50}$ and $d_{75}$ are the diameters (μm) of particles when the accumulated weights of the particles are on the order of 25, 50 and 75% of the total weight of the particles, respectively, and a, b, c are width, length and height of the cubic calcium carbonate particles and the shortest one among a, b and c is set a=1; and applying melt-extrusion to the polyester resin.

BRIEF DESCRIPTION OF THE DRAWING

The above object and other advantages of the present invention will become more apparent by describing in detail the preferred embodiment of the present invention with reference to the attached drawings in which.

DETAILED DESCRIPTION OF THE INVENTION

Figure 1:
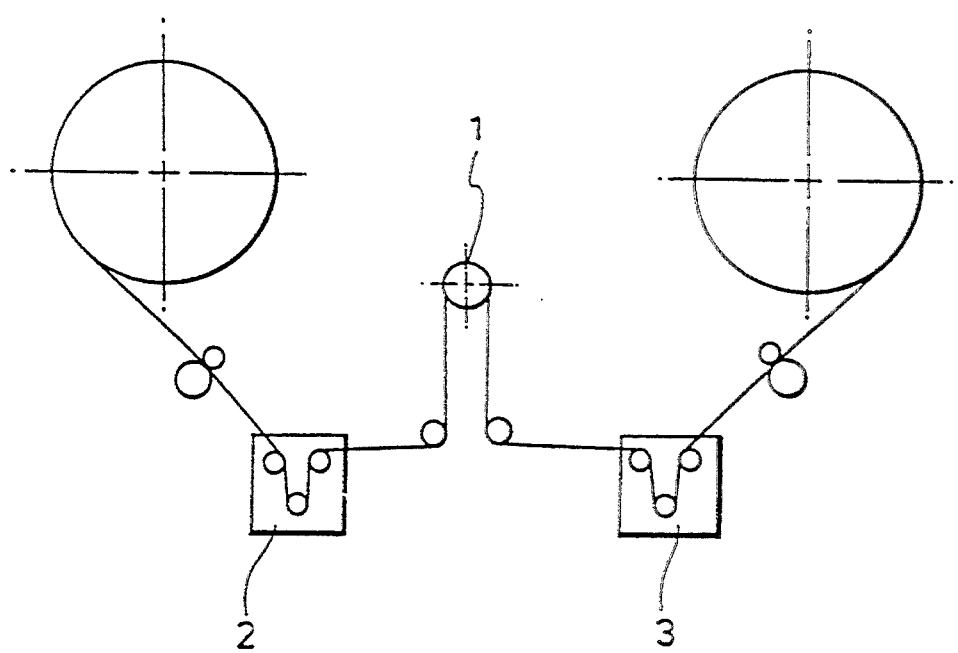
FIG. 1 is a schematic view showing a film-travelling system for testing travelling capability and abrasion resistance.

Polyesters are usually prepared from two main starting materials. One is a dicarboxylic acid, such as isophthalic acid, terephthalic acid, 2,6-naphthalene dicarboxylic acid, phthalic acid, adipic acid, sebacic acid or the ester derivatives thereof, or the mixture thereof. The other starting material is a glycol component, such as ethylene glycol, propylene glycol, butane diol, 1,4-cyclohexanedimethanol or neopentyl glycol or the mixture thereof.

In present invention, preferred is the polyester in which at least 80% of repeating unit consists of ethylene terephthalate or ethylene 2,6-naphthalate. If necessary, there may be added other additives, such as thermal stabilizer, anti-blocking agent, antioxidant, antistatic agent and ultraviolet absorber.

According to the present invention, a biaxially stretched polyester film is produced by adding cubic calcium carbonate particles of calcite structure satisfying the following conditions at any stage of polyester preparation, so as to prepare polyester and by the melt extrusion of the polymer:

$$d_{25}/d_{75} < 2.00 \tag{1}$$

$$0.7 \leq d_{50} \leq 1.50 \tag{2}$$

$$a:b:c = 1:(1 \sim 1.5):(1 \sim 1.5) \tag{3}$$

wherein $d_{25}$, $d_{50}$ and $d_{75}$ are the diameters (μm) of particles when the accumulated weights of the particles are on the order of 25, 50 and 75% of the total weight of the particles, respectively.

With regard to the cubic calcium carbonate of calcite structure, the distribution ratio of particle size, $d_{25}/d_{75}$, is preferably between 1.1 and 1.9. For example, if the distribution ratio is above 2.0, protrusions with a height of above 0.75 μm are formed on the film.

In case that the ratio of length to width to height is out of the range of the formula 3, the biaxially stretched film is deteriorated in abrasion resistance as well as scratch resistance because a great quantity of white powders are generated.

The amount of the cubic calcium carbonate of calcite structure is on the order of 0.01 to 1.0% by weight based on the total weight of the polyester film and preferably 0.05 to 0.5% by weight. For example, if the polyester film contains the cubic calcium carbonate particles of calcite structure in an amount of below 0.01 by weight, its slip property becomes poor and thus a blocking phenomena is induced due to friction between roll and the film, effecting a break in the film. On the other hand, if the polyester film contains the particles in an amount of above 1% by weight, the particles aggregate, to form huge protrusions.

As to the average diameter of the cubic calcium carbonate particles of calcite structure, it is preferably between 0.07 and 1.5 μm and more preferably between 0.2 and 1.0 μm. For example, if the cubic calcium carbonate particles have an average diameter of less than 0.07 μm, it is difficult to provide protrusions on the surface, which leads to the inferiority of slip property. On the other hand, if the average diameter of the particles exceed 1.5 μm, the surface roughness is increased and many huge protrusions are formed, so that drop-out takes place in a magnetic tape of the polyester film.

Particularly, if the cubic calcium carbonate particles have an average diameter of greater than 1.5 μm and are used in an amount of above 1.0% by weight, protrusion and depression are frequently generated on the film, leading to the production of loud noise when the film travels.

In accordance with one aspect of the present invention, a group of cubic calcium carbonate of calcite structure having an average diameter of 0.07 to 0.8 μm and another group of cubic calcium carbonate of calcite structure having an average diameter which are 1.2 to 5 times as large as the former group and at most 1.5 μm are added in an amount of 0.2 to 1.0% by weight and 0.005 to 0.25% by weight, respectively, based on the total weight of the polyester film.

In accordance with another aspect of the present invention, the biaxially stretched polyester film can be improved at once in slip property and in smoothness by further adding inorganic particles with an average diameter of not more than 1.5 μm in an amount of not more than 0.5% by weight of the cubic calcium carbonate particles of calcite structure. In this connection, different protrusions with different sizes are formed on the polyester film.

An inorganic particle mixture of cubic calcium carbonate particles of calcite structure and aluminum oxide is slurried to ethylene glycol only by filter treatment without the treatment of classification or pulverization and added at any stage of the synthesis of polyester, so as to obtain a polymer. This polymer is mixed, in a proper weight ratio, with another polymer obtained by a conventional method and then, subjected to melt extrusion at a temperature of 270° to 300° C., to cooling and solidification at a temperature of 40° to 70° C., so as to give a non-stretched polyester film. This film is stretched 3.0 to 4.0 times lengthwise at a temperature of 90° to 120° C. and 4.0 to 5.0 times crosswise at a temperature of 180° to 220° C., and thereafter, are subjected to heat treatment at a temperature of 200° to 240° C., so as to produce a biaxially stretched polyester film of the present invention.

The preferred embodiment of the present invention will now be further described with reference to specific examples. In the following examples and comparative examples, the polyester films and the magnetic tapes prepared were tested for physical properties as follows:

1. Average Diameter of Particles

The sizes of $d_{25}$, $d_{50}$ and $d_{75}$ in particle slurry were measured using a measuring device for particle size distribution commercially available from Simatsu, Japan under a trade name of SA-CP3, and $d_{50}$ was considered as the average diameter of particles. The length of each side of the particle was measured using an electron microscope.

2. Travelling Capacity

As shown in FIG. 1, a film was wound around a fixed metal roll (6 mm diameter) coated with hard chrome with the angle between the film and the roll being in an angle of 180° (3.142 rad ()). When the film was travelled in a speed of 1.1 m/sec under a tension of 50 g loaded in one side ($T_2$), resistance at the other side ($T_1$, g) was measured. Friction coefficient ($\mu K$) was obtained by the following formula:

$$\mu K = 1/\theta \ln (T_1/T_2) = 0.318 \ln (T_1/50)$$

3. Abrasion Resistance

As shown in FIG. 1, a film was wound around a fixed metal roll (diameter 6 mm, surface roughness 3S) coated with hard chrome with the angle between the film and the roll being in an angle of 180° (3.142 rad ($\theta$)). When the film was travelled in a speed of 1.1 m/sec for 60 sec. under a tension of 50 g, the amount of white powder on a metal pin 1 was measured with naked eyes and graded into the following standards:

A grade: no white powder
B grade: a very small quantity of white powder, little problematic in practice
C grade: a quantity of white powder, some problematic in practice
D grade: a large quantity of white powder, difficult in practice.

4. Scratch Resistance

This test was carried out using a testing device for tape-travelling capability, TBT-300D/H type (trade name, commercially available from K.K. Yokohama System, Japan). A tape of polyester film with a width of 0.5 inch was travelled on a tape guide pin of a video cassette (stainless guide pin with an Ra of 50 nm and an Rt of 2,500 nm) in a speed of 1.1 m/s at 20° C. and at 60% RH with a tension of 50 g. When the film was travelled 50 cycles with the winding angle being 180°, the number of the scratch generated was decided using an optical microscope.

A grade: no scratch
B grade: a few scratches
C grade: a fair number of scratches.

5. Surface Roughness (Ra)

The surface roughness of the polyester film was measured 20 times using a measuring device for surface roughness (trade name ET-10, manufactured by Kosaca, Japan) under the following conditions. Surface roughness (Ra) was determined by averaging the values measured 5 times.

Radius of needle : 0.5 μm
Length of needle : 1.0 mm
Load of needle : 5 mg
Cut-off value : 0.08 mm 6. Test for macro Protrusion on Film Macro protrusions with a height of above 0.75 μm were counted in 100 cm² of the polyester film, using a multi-interference microscope. The grades followed the standards;

First Grade: 0 count
Second Grade: 1-2 counts
Third Grade: 3-5 counts
Fourth Grade: 6-8 counts
Fifth grade : 9 or more counts

EXAMPLE 1

A mixture of 100 parts of dimethyl terephthalate, 70 parts of ethylene glycol, 0.09 part of manganese acetate four hydrates, and 0.04 part of antimony trioxide was charged into a reactor and heated to perform ester-interchange with ethanol being funneled. After completing the ester interchange for 4 hours, the resulting mixture was added with 0.06 part of ethyl acid phosphate and 1.0 part of cubic calcium carbonate particles of calcite structure which had an average diameter of 0.6 μm and a side length ratio of 1:1:1 and which were slurried to ethylene glycol and then, was subjected to polycondensation for 4 hours, so as to give polyester I.

36% by weight of the polyester I was mixed with 64% by weight of particleless polyester and subjected to melt extrusion at 290° C. and cooling solidification, so as to give an amorphous film which was then stretched 4 times lengthwise at 120° C. and subsequently 4.5 times crosswise at 135° C. Thereafter, this was treated at 220° C. for 3 seconds, to produce a biaxially stretched polyester film with a thickness of 14.5 μm.

The physical properties of the biaxially stretched polyester film were measured, and the results are given as shown in the following Table 1.

EXAMPLE 2

Polyester II was obtained as a result of polycondensing a mixture comprising 1.0 part of globular silica particles with an average of 0.5 μm, instead of calcium carbonate of calcite structure in Example 1.

A biaxially stretched polyester film was prepared in a manner similar to that of Example 1, except for using a composition consisting of 45% by weight of polyester I synthesized in Example 1, 14% by weight of polyester II and 41% by weight of particleless polyester.

The biaxially polyester film was tested for physical properties and the results are given as shown in Table 1.

EXAMPLE 3

Polyester III was obtained in a manner similar to that of polyester I, except that cubic calcium carbonate particles of calcite structure with an average diameter of 0.8 μm and a side length ratio of 1:1:1 was used.

A biaxially stretched polyester film was prepared in a manner similar to that of Example 1, except for using a composition consisting of 16% by weight of polyester I synthesized in Example 1, 8% by weight of polyester III and 76% by weight of particleless polyester.

The biaxially polyester film was tested for physical properties and the results are given as shown in Table 1.

EXAMPLE 4

Polyester IV was obtained in a manner similar to that of polyester I, except that aluminum oxide particles with an average of 0.05 μm was used.

A biaxially stretched polyester film was prepared in a manner similar to that of Example 1, except for using a composition consisting of 22% by weight of polyester I synthesized in Example 1, 10% by weight of polyester IV and 68% by weight of particleless polyester.

The biaxially polyester film was tested for physical properties and the results are given as shown in Table 1.

COMPARATIVE EXAMPLE 1

Polyester V was obtained in a manner similar to that of polyester I, except that shapeless calcium carbonate particles with an average of 0.6 μm was used instead of calcium carbonate of calcite structure.

A biaxially stretched polyester film was prepared in a manner similar to that of Example 1, except for using a composition consisting of 36% by weight of polyester V and 64% by weight of particleless polyester.

The biaxially polyester film was tested for physical properties and the results are given as shown in Table 2.

COMPARATIVE EXAMPLE 2

A biaxially stretched polyester film was prepared in a manner similar to that of Example 1, except for using a composition consisting of 45% by weight of polyester V, 14% by weight of polyester II and 41% by weight of particleless polyester.

The biaxially polyester film was tested for physical properties and the results are given as shown in Table 2.

COMPARATIVE EXAMPLE 3

Polyester VI was obtained in a manner similar to that of polyester I, except that shapeless calcium carbonate particles with an average of 0.8 μm was used.

A biaxially stretched polyester film was prepared in a manner similar to that of Example 1, except for using a composition consisting of 16% by weight of polyester V, 8% by weight of polyester VI and 76% by weight of particleless polyester.

The biaxially polyester film was tested for physical properties and the results are given as shown in Table 2.

COMPARATIVE EXAMPLE 4

A biaxially stretched polyester film was prepared in a manner similar to that of Example 1, except for using a composition consisting of 22% by weight of polyester V, 10% by weight of polyester IV and 68% by weight of particleless polyester.

The biaxially polyester film was tested for physical properties and the results are given as shown in Table 2.

TABLE 1

| | Example No. | | | |
|---|---|---|---|---|
| | 1 | 2 | 3 | 4 |
| Calcite Calcium Carbonate | | | | |
| Average Diameter(μm) | 0.6 | 0.6 | 0.6 | 0.6 |
| Amount (wt %) | 0.36 | 0.45 | 0.16 | 0.22 |
| Side length ratio | 1:1:1 | 1:1:1 | 1:1:1 | 1:1:1 |
| Globular Silica | | | | |
| Average Diameter(μm) | | 0.5 | | |
| Amount(wt %) | | 0.14 | | |
| Calcite Calcium Carbonate | | | | |
| Average Diameter (μm) | | | 0.8 | |
| Amount (wt %) | | | 0.08 | |
| Side length ratio | | | 1:1:1 | |
| Aluminum Oxide | | | | |
| Average Diameter (μm) | | | | 0.05 |
| Amount(wt %) | | | | 0.1 |
| Film Test | | | | |
| Friction Coeff.(μK) | 0.26 | 0.25 | 0.27 | 0.22 |
| Roughness (Ra) (μAM) | 0.017 | 0.021 | 0.0185 | 0.0165 |
| Abrasion Resist.(grade) | A | A | A | A |

TABLE 1-continued

|  | Example No. | | | |
| --- | --- | --- | --- | --- |
|  | 1 | 2 | 3 | 4 |
| Scratch Resist.(grade) | A | A | A | A |
| Macro Protrusion(grade) | 1 | 1 | 2 | 1 |

TABLE 2

|  | Comparative Example No. | | | |
| --- | --- | --- | --- | --- |
|  | 1 | 2 | 3 | 4 |
| Shapeless Calcium Carbonate | | | | |
| Average Diameter(mm) | 0.6 | 0.6 | 0.6 | 0.6 |
| Amount (wt %) | 0.36 | 0.45 | 0.16 | 0.22 |
| Globular Silica | | | | |
| Average Diameter(μm) |  | 0.5 |  |  |
| Amount(wt %) |  | 0.14 |  |  |
| Shapeless Calcium Carbonate | | | | |
| Average Diameter (μm) |  |  | 0.8 |  |
| Amount (wt %) |  |  | 0.08 |  |
| Aluminum Oxide | | | | |
| Average Diameter (μm) |  |  |  | 0.05 |
| Amount(wt %) |  |  |  | 0.1 |
| Film Test | | | | |
| Friction Coeff.(μK) | 0.29 | 0.26 | 0.29 | 0.24 |
| Roughness (Ra) (μm) | 0.018 | 0.023 | 0.020 | 0.017 |
| Abrasion Resist.(grade) | B | B | B | A |
| Scratch Resist.(grade) | B | B | B | A |
| Macro Protrusion(grade) | 2 | 2 | 3 | 2 |

Other features, advantages and embodiment of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for the production of biaxially stretched polyester film, comprising the steps of: adding to a polyester resin at any stage of its preparation, cubic calcium carbonate particles of calcite structure satisfying the following conditions:

$$d_{25}/d_{75} < 2.00 \tag{1}$$

$$0.7 \leq d_{50} \leq 1.50 \tag{2}$$

$$a:b:c = 1:(1\sim 1.5):(1\sim 1.5) \tag{3}$$

wherein $d_{25}$, $d_{50}$ and $d_{75}$ are the diameters (μm) of particles when the accumulated weights of the particles are on the order of 25, 50 and 75% of the total weight of the particles, respectively, and a, b, c are width, length and height of the cubic calcium carbonate particles and the shortest one among a, b and c is set a=1; melt-extrusing the polyester resin composition to form a film; and thereafter biaxially stretching said film.

2. A method for the production of biaxially stretched polyester film set forth as claim 1, further comprising a step of adding another type of inorganic particles.

3. A method for the production of biaxially stretched polyester film set forth as claim 1, wherein the cubic calcium carbonate particles of calcite structure is added in an amount of 0.01 to 1.0% by weight based on the total weight of the polyester.

4. A method for the production of biaxially stretched polyester film set forth as claim 1, wherein the cubic calcium carbonate particles of calcite structure consist of a group having an average diameter of 0.07 to 0.8 μm and another group having a different average diameter which are 1.2 to 5 times as large as the former group and at most 1.5 μm, the former group and the latter group being added in an amount of 0.2 to 10% by weight and 0.005 to 0.25% respectively, based on the total weight of the polyester film.

5. A method for the production of biaxially stretched polyester film set forth as claim 2, wherein the inorganic particles are aluminum oxide particles with an average of not more than 0.5 μm and are added in an amount of 0.5% by weight based on the cubic calcium carbonate particle of calcite structure.

* * * * *